United States Patent
Harrell et al.

(10) Patent No.: US 10,476,416 B2
(45) Date of Patent: Nov. 12, 2019

(54) AUTOMATIC AIR DEFROST SYSTEM

(71) Applicant: John Bean Technologies Corporation, Chicago, IL (US)

(72) Inventors: Ryan Harrell, Clyde, OH (US); Alan McGinnis, Bellevue, OH (US); John D. Woodburn, Sandusky, OH (US)

(73) Assignee: John Bean Technologies Corporation, Chicago, IL (US)

( * ) Notice: Subject to any disclaimer, the term of this patent is extended or adjusted under 35 U.S.C. 154(b) by 290 days.

(21) Appl. No.: 15/332,944

(22) Filed: Oct. 24, 2016

(65) Prior Publication Data

US 2018/0112907 A1    Apr. 26, 2018

(51) Int. Cl.
| | |
|---|---|
| H02P 7/00 | (2016.01) |
| H02P 23/24 | (2016.01) |
| H02P 29/40 | (2016.01) |
| F25D 21/00 | (2006.01) |
| F25D 21/10 | (2006.01) |

(52) U.S. Cl.
CPC .............. *H02P 7/00* (2013.01); *F25D 21/006* (2013.01); *F25D 21/10* (2013.01); *H02P 23/24* (2016.02); *H02P 29/40* (2016.02)

(58) Field of Classification Search
CPC .. H02P 7/00; H02P 23/24; H02P 29/40; F25D 21/006; F25D 21/10; F25D 21/00; F25D 21/002; F25D 21/004; F25D 21/02
USPC ............................................................ 62/82
See application file for complete search history.

(56) References Cited

U.S. PATENT DOCUMENTS

| | | | |
|---|---|---|---|
| 4,528,820 A * | 7/1985 | Jonasson | F25D 21/10 15/316.1 |
| 4,570,447 A | 2/1986 | Jonasson | |
| 5,711,981 A | 1/1998 | Wilson et al. | |
| 2002/0175598 A1* | 11/2002 | Heim | H01L 41/0986 310/328 |
| 2015/0028707 A1* | 1/2015 | Kim | H02K 1/2773 310/156.01 |
| 2015/0288310 A1* | 10/2015 | Pace | H02P 21/18 318/400.02 |
| 2016/0222950 A1* | 8/2016 | Kawamori | F04B 17/03 |
| 2016/0258439 A1* | 9/2016 | Kocher | F24F 11/30 |

* cited by examiner

*Primary Examiner* — Frantz F Jules
*Assistant Examiner* — Steve S Tanenbaum
(74) *Attorney, Agent, or Firm* — Christenssen O'Connor Johnson Kindness PLLC

(57) ABSTRACT

A method and apparatus for controlling the direction of a defrost device for refrigeration coils includes measuring the current drawn by or the torque produced by a permanent magnet motor, wherein the permanent magnet motor powers a defrost device recurrently back and forth along refrigeration coils and reverses the direction of the permanent magnet motor when the measured current drawn or measured torque produced are at or above a first limit. The method omits the use of switches and sensors to signal when the defrost device is reversed to reduce failures and stoppages.

30 Claims, 6 Drawing Sheets

AUTOMATIC AIR DEFROST SYSTEM

BACKGROUND

Freezers will often produce frost due to air moisture condensing and then freezing on the cooling coils in the course of normal operation. The frost reduces the efficiency of the freezer. Conventional methods of removing the frost from the cooling coils include the methods and apparatus disclosed in U.S. Pat. No. 4,570,447. The '477 patent discloses removing the frost by directing a current of compressed air over the cooling coil batteries. Referring to FIG. 1, which is a FIGURE of the '447 patent, a typical freezer is shown having a plurality of cooling coils 38 (refrigeration coils). A tank 30 is mounted on a wheeled carriage 34, which in turn is supported on tracks 36. The tank 30 is supplied by the air inlet hose 32 and includes a plurality of nozzles. Some of the nozzles are oriented in one direction and some of the nozzles are oriented in an opposite direction. In this way, the tank 30 can move back and forth by opening the valves to the nozzles pointed in one direction and then opening the valves to the nozzles pointed in the other direction.

FIG. 2, also from the '447 patent, shows another typical apparatus for removing frost from cooling coil batteries. The air nozzle apparatus includes two pipes 3 and 4 directed toward the cooling coil battery 1. The pipes are supplied with compressed air through a hose 19. The pipes are connected to a chain sprocket wheel 15, which in turn is intermeshed with an endless loop chain 10 looped around wheels 11 and 12. The sprocket 15 is further attached to a support post 7 which is guided along the rail 8. Further, a driving unit, such as a motor, can be linked to turn any one of the sprocket wheels 11, 12, or 15. Therefore, the chain can be driven to one side or the other thereby causing the pipes to rotate at the same time the assembly is moved back and forth, thereby removing the frost from the cooling coil batteries.

SUMMARY

In some embodiments, a freezer includes cooling coils; a defrost device directed at the cooling coils, wherein the defrost device travels recurrently along the cooling coils; and a permanent magnet motor operatively connected to the defrost device to power the defrost device recurrently across the cooling coils.

In some embodiments, the freezer further comprises an AC frequency inverter or DC drive connected to the permanent magnet motor; a torque meter or current meter that measures the torque produced or current drawn by the permanent magnet motor; and a controller having circuitry that compares a torque measurement or current measurement to pre-determined values representing the performance characteristics of the permanent magnet motor and reverses direction of the permanent magnet motor when the torque measurement or current measurement has reached a first limit. The torque or current meter can be integral to the permanent magnet motor or to the drive.

In some embodiments, the controller has circuitry that compares a torque measurement or current measurement to pre-determined values representing the performance characteristics of the permanent magnet motor and increases motor speed when the torque measurement or current measurement is below the first limit and at or above a second limit.

In some embodiments, the permanent magnet motor does not include a gear reducer between a motor shaft and the defrost device.

In some embodiments, the cooling coils, the defrost device, the permanent magnet motor, and the AC frequency inverter or DC drive are within an enclosure that is maintained below freezing (0° C.).

In some embodiments, the defrost device comprises nozzles directed at the cooling coils.

In some embodiments, the freezer further comprises a source of pressurized air connected to the nozzles.

In some embodiments, the cooling coils are exposed to moisture in air.

In some embodiments, the freezer does not have switches to signal reversing travel direction of the defrost device.

In some embodiments, the permanent magnet motor is powered by direct current supplied by a battery or rectified alternating current.

In some embodiments, the permanent magnet motor comprises a rotor with permanent magnets and a stator with field windings.

In some embodiments, the permanent magnet motor comprises permanent magnets selected from the group consisting of aluminum-nickel-cobalt, ceramic/ferrite, samarium-cobalt, and neodymium-iron-boron.

In some embodiments, the freezer further comprises a speed controller.

In some embodiments, a method for controlling the direction of a defrost device for cooling coils includes measuring the current drawn by or the torque produced by a permanent magnet motor, wherein the permanent magnet motor powers a defrost device recurrently along cooling coils; and reversing the direction of the permanent magnet motor when the measured current drawn or measured torque produced are at or above a first limit.

In some embodiments, the method comprises directing air over frost accumulated on the cooling coils.

In some embodiments, the method comprises comparing the measured current drawn to pre-determined values representing performance characteristics of the permanent magnet motor.

In some embodiments, the method comprises comparing the measured torque produced to pre-determined values representing performance characteristics of the permanent magnet motor.

In some embodiments, the method comprises comparing the measured current drawn to pre-determined values representing performance characteristics of the permanent magnet motor, and increasing the permanent magnet motor speed when the measured current is below the first limit and above a second limit.

In some embodiments, the method comprises reducing the speed of the permanent magnet motor when the measured current drawn is no longer above the second limit.

In some embodiments, the method comprises comparing the measured torque produced to pre-determined values representing performance characteristics of the permanent magnet motor, and increasing permanent magnet motor speed when the measured torque is below the first limit and above a second limit.

In some embodiments, the method comprises reducing the speed of the permanent magnet motor when the measured torque is no longer above the second limit.

In some embodiments, the method comprises operating the permanent magnet motor at a first speed, and operating the permanent magnet motor at a second higher speed when the measured current drawn by the permanent magnet motor or the torque produced by the permanent magnet motor are below the first limit and above a second limit.

In some embodiments, the method comprises increasing voltage to increase speed of the permanent magnet motor.

In some embodiments, the method comprises reducing the speed of the permanent magnet motor to the first speed when the measured current or torque is no longer above the second limit.

In some embodiments, the method comprises reversing polarity of the permanent magnet motor to reverse direction of the permanent magnet motor.

In some embodiments, a defrost system for a freezer having a defrost device includes: a permanent magnet motor; an AC frequency inverter or DC drive connected to the permanent magnet motor; a torque meter or current meter that measures the torque produced or current drawn by the permanent magnet motor; and a controller having circuitry that compares a torque measurement or current measurement to pre-determined values representing the performance characteristics of the permanent magnet motor and reverses direction of the permanent magnet motor when the torque measurement or current measurement has reached a first limit.

In some embodiments, the permanent magnet motor comprises a shaft and a linkage connecting the shaft to a defrost device to power the defrost device.

In some embodiments, the linkage does not comprise a gearbox.

In some embodiments, the defrost system does not include a switch to signal reversing direction of the defrost device.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

A problem with the conventional means of driving the defrosting air nozzles or other defrost device recurrently back and forth along the cooling coil batteries is that control of the travel direction is ultimately provided by externally or internally mounted switches. The switches are not reliable and have a high failure rate when used inside a freezing environment. The failure of the switches will result in stoppage of the air nozzles resulting in frost build up and loss of cooling efficiency. Inevitably, this causes a reduction of production capacity as the coils have to be defrosted manually until the switches can be repaired or replaced. This disclosure provides various embodiments for improving upon the prior art defrosting systems.

In some embodiments, a freezer with a defrost device does not use a sensor or a mechanical position switch to signal when to reverse direction of the defrost device. In some embodiments, an apparatus for reversing or altering direction of a defrost device includes a permanent magnet motor. In some embodiments, the permanent magnet motor does not have a gearbox. In some embodiments, the permanent magnet motor has a AC frequency inverter or a DC drive, a controller, and software or logic circuitry to control the direction based on measured current or torque or both current and torque.

Figure 3:
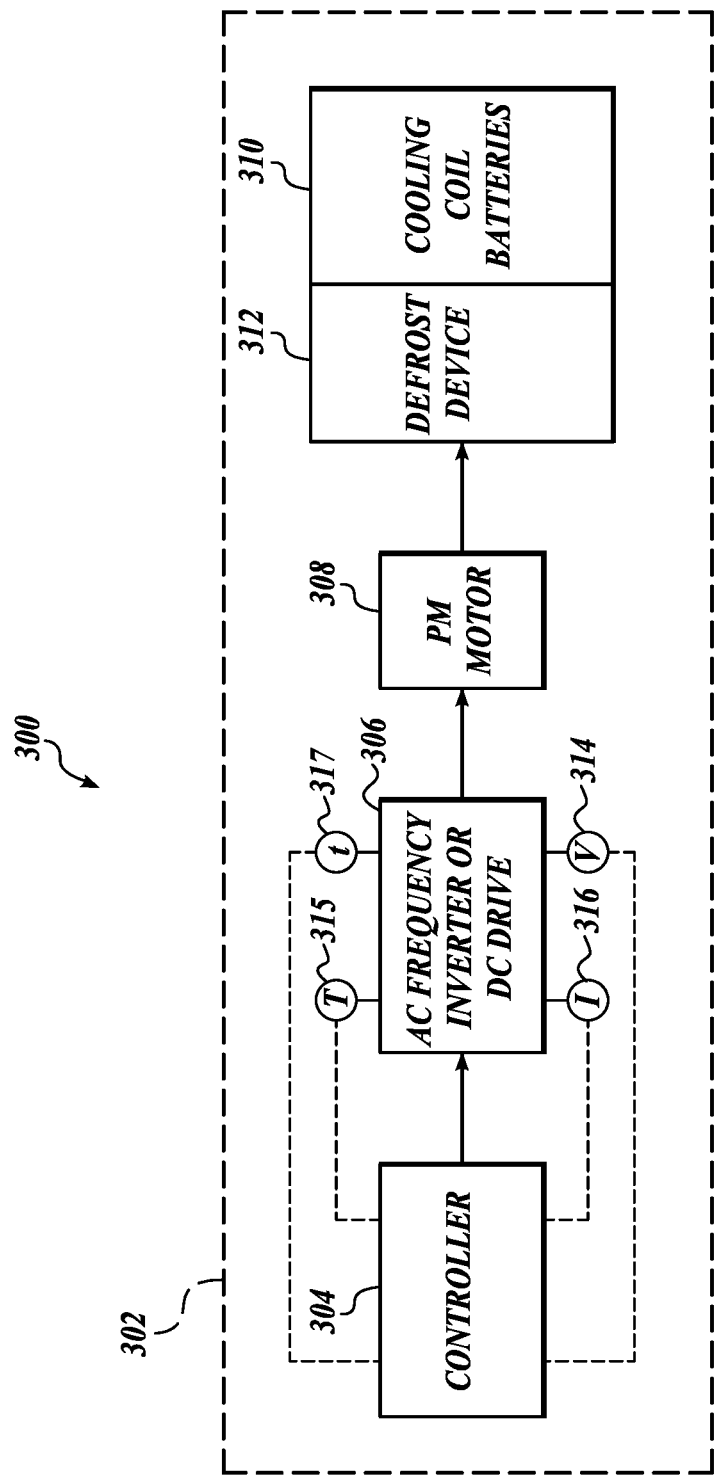
FIG. 3 is a schematic diagram of a freezer according to an embodiment of this disclosure.

Referring to FIG. 3, a schematic illustration showing a freezer 300 and a defrost device 312 for the removal of frost on cooling coil batteries is illustrated. As used herein, cooling coil batteries refers to any refrigeration coils, tubes, or any other vessel that can accumulate frost through the contact of air moisture with such coils, tubes, or vessels. In some embodiments, the cooling coils provide their cooling effect through evaporation of a refrigerant inside the coils.

The relevant components of a freezer 300 in accordance with embodiments of this disclosure are illustrated in FIG. 3. The freezer 300 includes an enclosure 302 designated by the broken line in FIG. 3. The enclosure 302 can include any walls or insulation or any other materials designed to reduce heat transfer to the inside of the enclosure to keep the enclosure at a low temperature, preferably below freezing. In some embodiments, the enclosure 302 can designate an entire room. As is well known, some freezers operate on the principle of a refrigeration cycle including an evaporator and condenser. Some evaporators include coils in which a refrigerant is allowed to vaporize, thus, producing the cooling effect. Some evaporator coils can produce low temperatures below the freezing point of 0° C. Accordingly, evaporator coils can be covered by frost through contact with moisture in air. Where a large capacity for cooling is required, the cooling coils may constitute sets of cooling coil batteries assembled together. However, this disclosure is not limited to coiling coil batteries, but can be applied to all refrigeration coils where frost may form and is desired to be removed.

Figure 1:
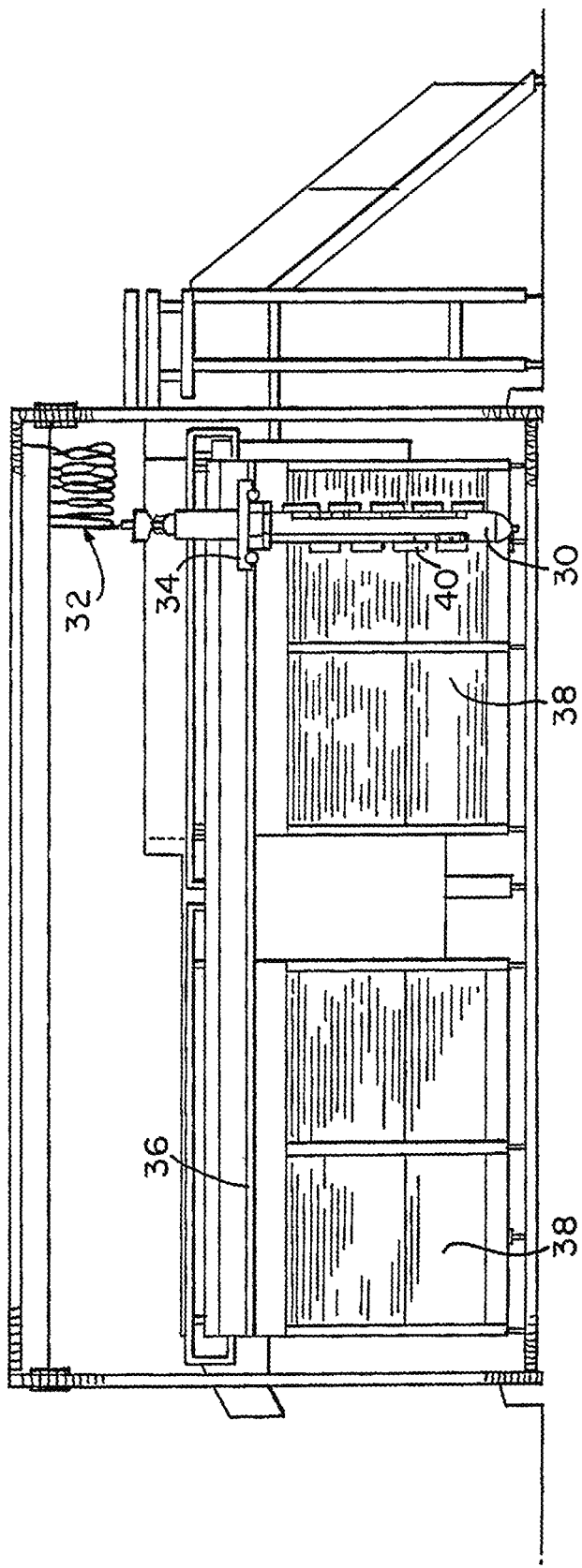
FIG. 1 is a diagrammatical illustration of a prior art defrost device for cooling coil batteries.
Figure 2:
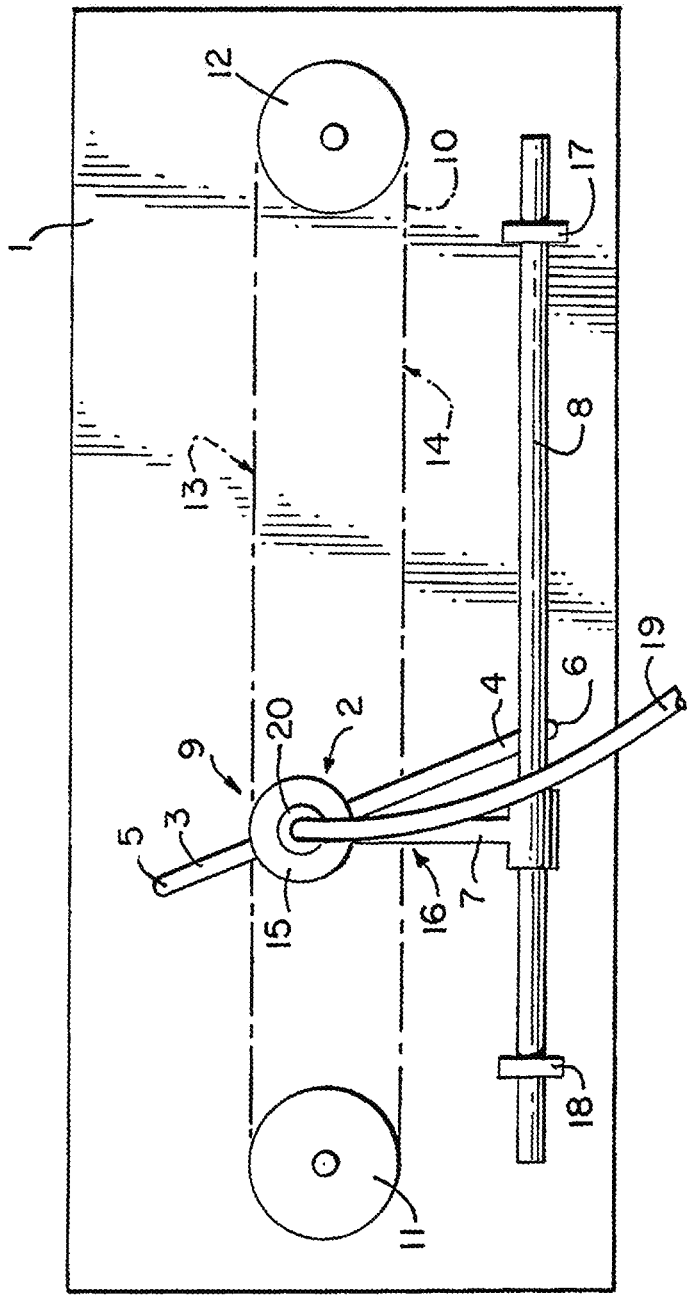
FIG. 2 is a diagrammatical illustration of a prior art defrost device for cooling coil batteries.

Any mechanical switches or sensors that are used inside the freezer or that experience freezing temperatures can fail due to water and frost forming in or on the inside of the mechanical switches or for other reasons. Conventional freezers typically use a mechanical sensor or switch to signal the reversal of the direction of the air nozzles that travel back and forth along the cooling coils of a freezer. The air nozzles are connected to a traveling carriage that travels back and forth along a defined path. Mechanical switches may be used in the prior art devices of FIGS. 1 and 2 to signal when the carriage and air nozzles have reached the left side and the right side extreme limits of travel.

In this disclosure, the mechanical switches used to signal the reversal of direction of the defrost device are not used. In this disclosure, external position sensors used to signal the reversal of the direction of the defrost device are eliminated. In this disclosure, control of the back and forth recurrent movement of the defrost device is achieved by the use of a permanent magnet motor 308, without a gear box, in some embodiments. The apparatus also includes an alternating current (AC) frequency inverter or direct current (DC) drive 306, and a programmable controller 304, such as programmable logic controller (PLC).

The defrost device 312 used for removing frost from the coiling coil batteries 310 can be of any design, including, but not limited to air blowers. The freezer 300 may include any one of the known devices to defrost refrigeration coils wherein the device travels in two or more directions, such as recurrently back and forth along the cooling coils to remove frost from the refrigeration coils. In some embodiments, recurrent travel means back and forth in a linear path. In some embodiments, recurrent travel also includes circular paths or a combination of circular and linear paths. In some embodiments, the defrost device includes nozzles supplied with pressurized air or another fluid to blow or spray the frost away. In some embodiments, the defrost device includes wipers that can physically contact the cooling coils to scratch the frost off. Depending on the defrost device used, the defrost device 312 is mechanically linked to the rotor of the permanent magnet motor 308, without the need for a gearbox.

A permanent magnet motor may refer to a motor that does not rely solely on induction. A permanent magnet motor can include motors that do not rely entirely on current for magnetization. For example, a permanent magnet motor may refer to a permanent magnet direct current motor (PMDC motor) or a permanent magnet synchronous motor (PMSM). Permanent magnet alternating current (PMAC) and brushless AC motors are synonymous with a PMSM motor. Variations of the foregoing permanent magnet motors are also included within the meaning of permanent magnet motor. As the various types of permanent magnet motors are well-known, a detailed description of the theory and construction of the various types of permanent magnet motors can be omitted. For purposes of this disclosure, the basic components of a suitable permanent magnet motor are described herein.

Figure 4:
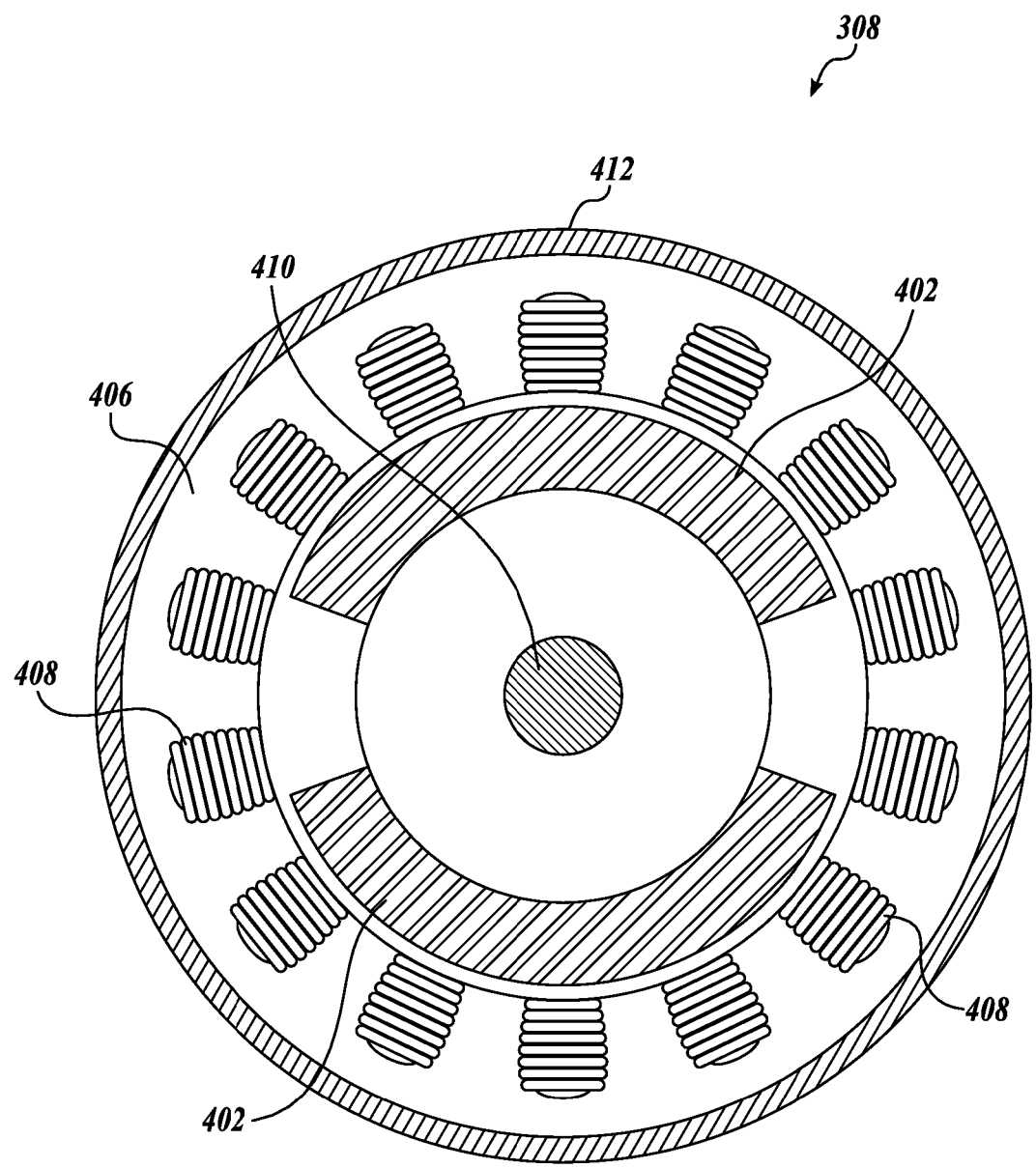
FIG. 4 is a diagrammatical illustration of a permanent magnet motor according to an embodiment of this disclosure.

Referring to FIG. 4, in some embodiments, the permanent magnet motor 308 includes two basic components including the rotor and stator. In FIG. 4, the permanent magnets 402 are on the rotor, which also includes the shaft 410. In FIG. 4, the stator 406 includes the windings 408 encased within a motor casing 412. While a simplified illustration is used to show the basic parts, it is to be understood that permanent magnet motors can come in many different configurations, so it is to be understood that the motor of FIG. 4 is not meant to be limiting.

Permanent motors produce torque through the interaction of magnetic fields of the rotor and stator. As the name implies, a permanent magnet motor uses permanent magnets rather than field windings in one of the stator or rotor. The stator or rotor without permanent magnets relies on windings to generate the opposite magnetic field that is repelled by the permanent magnets, thus producing torque. In some embodiments of the permanent magnet motor, the permanent magnet motor does not have windings on the stator and relies on the permanent magnets to create the magnetic field that interacts with the rotor field to produce the torque that turns the shaft. However, in some embodiments of the permanent magnet motor, the permanent magnet motor does not have windings on the rotor and relies on the permanent magnets to create the magnetic field that interacts with the stator field to produce the torque that turns the shaft. In some embodiments, a commutator is used with permanent magnet DC motors. However, other permanent magnet DC motors may omit the commutator in favor of more sophisticated control. Given the large variety of permanent magnet motors, and also depending on the freezer and the number or size of the cooling coils, the suitable permanent magnet can vary with the specific application. The permanent magnet motor for use in embodiments according to this disclosure are generally commercially available and are permanent magnet motors that can change direction or rotation and change speed.

Referring to FIG. 3, the freezer 300 includes an alternating current (AC) frequency inverter or a direct current (DC) drive 306 ("drive") connected to the permanent magnet motor 308. The selection of a drive 306 will depend on the type of permanent magnet motor 308. The drive 306 is selected to be compatible with the selected permanent magnet motor 308. The drive 306 can be internal to the permanent magnet motor 308 or external to the permanent magnet motor 308.

Generally, the AC frequency inverter and the DC drive 306 are for providing power of the appropriate characteristics to run the permanent magnet motor, controlling both the speed and direction. The drive 306, for example, can vary the voltage, the frequency, or the amperage to control the speed and direction of the permanent magnet motor 308. In some embodiments, the AC frequency inverter and the DC drive 306 are readily commercially available devices. In some embodiments, the AC frequency inverter, for example, includes circuitry for rectifying alternating current to direct current, circuitry for controlling the speed of the permanent magnet motor, and circuitry for controlling the direction of permanent magnet motor 308. In some embodiments, the DC drive, for example, includes circuitry for controlling the speed of the permanent magnet motor 308, and circuitry for controlling the direction of permanent magnet motor 308. In some embodiments, the AC frequency inverter and the DC drive 306 may include one or more instruments including one or more current meters 316, one or more volt meters 314, one or more torque meters 317, and one or more temperature meters 315. Other instruments may include speed and rpm meters. Alternatively or additionally, the one or more current meters 316, one or more volt meters 314, one or more torque meters 317, and one or more temperature meters 315 and rpm instruments can be provided on the permanent magnet motor 308. The placement of instruments shown in FIG. 3 is not meant to limit the instruments exclusively on the drive 306.

In a PMSM, the rotational speed is in direct proportion to the frequency of the power sent to the motor. Synchronous means that the motor rotates at the same speed as the magnetic field. Thus, the higher the frequency from the drive 306, the higher the revolutions (rpms) of the motor. A variable frequency drive (VFD) is used to control the speed, for example, of a PMSM. The circuitry in a drive for speed and direction control of a PMSM motor is known and is commercially available in packaged modules. One method of control for a PMSM motor is referred to as vector control or field oriented control. Another method for control of a PMSM is direct torque control.

In PMDC motors, the rotational speed of a PMDC motor is proportional to the electromotive force in its coil (the voltage applied to it minus voltage lost on its resistance). In some embodiments, the circuitry for controlling the speed of the PMDC motor changes the applied voltage to the PMDC motor. In some embodiments, the circuitry for speed control includes a potentiometer. In some embodiments, the circuitry for speed control can include variable battery tappings, variable supply voltage, resistors, or electronic controls. The effective voltage can be varied by inserting a series resistor or by an electronically controlled switching device made of thyristors or transistors. In some embodiments, reversing the direction of the PMDC motor includes reversing the polarity of the lead wires to the PMDC motor.

In some embodiments, the drive 306 includes circuitry for reversing the polarity. Reversing the polarity can be done with a special set of contactors (direction contactors). In some embodiments, the circuitry for reversing direction includes one or more relays. In some embodiments, the circuitry for reversing direction may include an H-bridge. While examples of circuitry for speed control and reversing direction are disclosed, other circuitry can be used that does not rely on these methods. In many cases, the circuitry for speed control and direction control for permanent magnet motors are readily commercially available products.

Referring to FIG. 3, the freezer 300 includes a controller 304 that can be programmed to carry out a set of instructions. For example, the controller 304 can be programmed to control the speed and direction of the permanent magnet motor 308 based on inputs, such as, but not limited to torque, time, temperature, amperage, or a combination. In some embodiments, the controller 304 makes decisions regarding the direction and speed of the permanent magnet motor 308, and the drive 306 adjusts the power delivered to the motor to carry out the direction and speed set by the controller. The controller 304 can be packaged together with the drive 306, or the controller 304 can be packaged separately. The controller 304 can be a commercially available product. In some embodiments, the controller 304 has a user interface for inputting instructions and receiving feedback. The controller 304 may include a memory unit for storing instructions on operating the permanent magnet motor 308. Such instructions can be in the form of software or circuitry and hardware. A keyboard or other input device is provided to enable the operator to communicate with the controller 304. For example, the operator may set limits of the amount of torque or current draw that signals when the permanent magnet motor 308 reverses direction and speeds up. Also, a display or other output device is provided to convey information from the controller 304 to the operator, including the functioning of the permanent magnet motor 308. The controller 304 controls the operation of the permanent magnet motor 308 through interfacing with the AC frequency inverter or the DC drive 306. For example, the controller 304 can send signals in the form of digital or analog signals to direct the AC frequency inverter or the DC drive 306 to start or stop the permanent magnet motor 308 and when to speed up or slow down the permanent magnet motor 308 and when to reverse the permanent magnet motor 308.

In some embodiments, the controller 304 includes one or more inputs and one or more outputs. A common industry standard of 4 mA to 20 mA can be used as inputs. In some embodiments, the controller 304 can be built into the AC frequency inverter or the DC drive 306. In some embodiments, the controller 304 can be a separate device that can be in communication with the AC frequency inverter and the DC drive 306 through a wired link or a wireless link. In some embodiments, the controller 304 outputs a signal to set the speed of the permanent magnet motor 308 and to reverse the direction of the permanent magnet motor 308. In some embodiments, the controller 304 includes a microprocessor to carry out logic instructions based on one or more inputs. In some embodiments, the controller 304 may include a programmable logic controller (PLC) to carry out logic instructions based on one or more inputs. PLCs are readily known and widely available modules for process control. The controller 304 makes decisions when and whether to output a signal to reverse the direction of the permanent magnet motor 308, increase the speed of the permanent magnet motor 308, and decrease the speed of the permanent magnet motor 308.

The controller 304 receives input signals, such as a range of current or voltage that represents torque output 317 by the permanent magnet motor, current draw 316 by the permanent magnet motor, voltage 314 applied to the permanent magnet motor, and the ambient operating temperature 315, which can be used to control the operation of the permanent magnet motor based on an algorithm. Although, torque, current, voltage, and temperature are shown as inputs, the controller may also include other inputs, such as speed, rpm, time, and the like. For example, time or revolutions can be used to determine the position of the permanent magnet motor 308 or the defrost device 312 or both. The controller 304 may output a digital signal, (e.g., on or off) or an analog signal (e.g. 4 mA to 20 mA) for speed control, for example.

Figure 5:
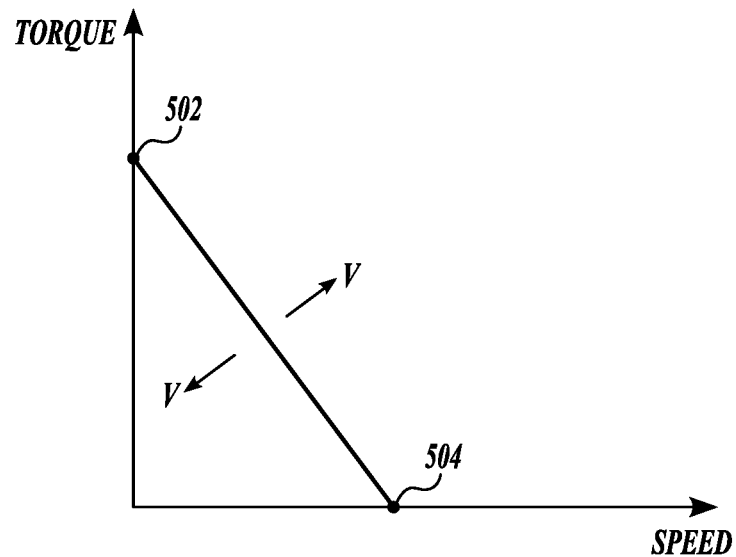
FIG. 5 is graphical representation of a performance curve of a permanent magnet motor according to one embodiment of this disclosure.
Figure 6:
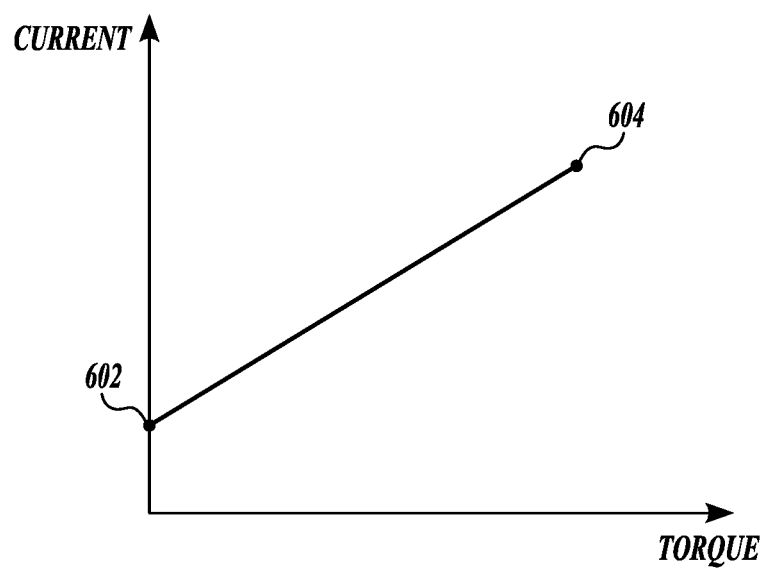
FIG. 6 is graphical representation of a performance curve of a permanent magnet motor according to one embodiment of this disclosure.

The performance characteristics of a PMDC motor are illustrated in FIGS. 5 and 6. As seen in FIG. 5, the relationship of speed versus torque and speed versus voltage (V) is a linear relationship. The speed versus torque performance curve is defined by the stall torque at 502 reached at zero speed and the no-load speed reached at 504. For a PMDC motor, the performance curves of speed versus torque can be stored in a memory in the controller as a table or relational database as pre-determined values, or as a function. Further, a plurality of performance curves can be stored, each one representing a different voltage or a different temperature or both. According to one embodiment, the torque versus speed performance curves allow knowing when the PMDC motor is stalled, which represents when the defrost device is at the limit of travel, and therefore the direction needs to be reversed.

Accordingly, when the stall torque of the PMDC motor is known, a torque meter can be used to determine if the motor has stalled. An instance when the PMDC motor has stalled is when the defrost device 312 has reached its limit of travel in one direction. Therefore, the controller 304 can constantly receive a signal representing the motor torque output from the torque meter 317. In some embodiments, the controller 304 is constantly comparing the torque measurement to the torque curve. When the measured torque is at or within a range of the stall torque, the controller 304 may send a signal to reverse the direction of the PMDC motor. Once the direction of the PMDC motor is reversed, and the torque of the PMDC motor decreases, the process is repeated—the controller 304 continues comparing the torque measurement to the torque curve to find when the defrost device 312 has reached its limit of travel in the opposite direction. In some embodiments, the measured torque may increase but be below the stall torque. When the measured torque is below the stall torque but above the designed operating range of torque, the increased torque may be a sign that a greater than normal amount of frost has accumulated, and the controller 304 may send a signal to increase the speed of the PMDC motor to keep up with the greater accumulation of frost. FIG. 5 also shows that the voltage applied to a PMDC motor has a proportional relationship to the speed. Specifically, the rotational speed of a PMDC motor is proportional to the electromotive force in its coil (the voltage applied to it minus voltage lost on its resistance). Therefore, in some embodiments, increasing the speed of a PMDC motor requires increasing the voltage applied to the motor. Similarly, decreasing the speed of a PMDC motor requires decreasing the voltage applied to the motor.

Referring to FIG. 6, the relationship of torque versus current is also proportional or linear for a PMDC motor. The linear curve is defined by the maximum current draw at 604 reached at stall torque and the minimum current at 504 reached at no-load speed. For a PMDC motor, the performance curves of torque versus current can be stored in a memory in the controller 304 as a table, relational database, or as a function. Further, a plurality of performance curves can be stored, each one representing a different voltage or a different temperature or both. According to one embodiment, the torque versus current performance curves allow knowing when the PMDC motor is stalled, which represents that the defrost device 312 is at the limit of travel, and therefore the direction needs to be reversed.

Accordingly, when the maximum current draw of the PMDC motor is known, a current meter can be used to determine if the motor has stalled. An instance when the PMDC motor has stalled is when the defrost device has reached its limit of travel in one direction. Therefore, the controller 304 can constantly receive a signal representing the motor current draw from the current meter 316. In some embodiments, the controller 304 is constantly comparing the current measurement to the current curve. When the measured current is at or within a range of the maximum current draw, the controller may send a signal to the circuitry to reverse the direction of the PMDC motor. Once the direction of the PMDC motor is reversed and the current draw of the PMDC motor decreases, the process is repeated—the controller 304 continues comparing the current measurement to the current curve to find when the defrost device 312 has reached its limit of travel in the opposite direction. In some embodiments, the measured current may increase but be below the maximum current draw. When the measured current is below the maximum current draw but above the designed operating range of current, the increased current draw may be a sign that a greater than normal amount of frost has accumulated, and the controller 304 may send a signal to increase the speed of the PMDC motor to keep up with the greater accumulation of frost.

The performance curves for a PMSM motor are more complex than for a PMDC motor. However, the performance curves for a PMSM can be input into the controller 304 and stored in a memory in the controller 304 as a table or relational database as pre-determined values, or as a function. This data describes the relationships between speed, amperage, voltage, frequency, torque, and efficiency, for example. When the relationship between speed and torque or between speed and amperage are known, then one can use torque and amperage to infer speed, such that the motor direction can be reversed when speed is at zero. In some embodiments, the position can also be determined by keeping track of the time after speed reaches zero, for example.

Figure 7:
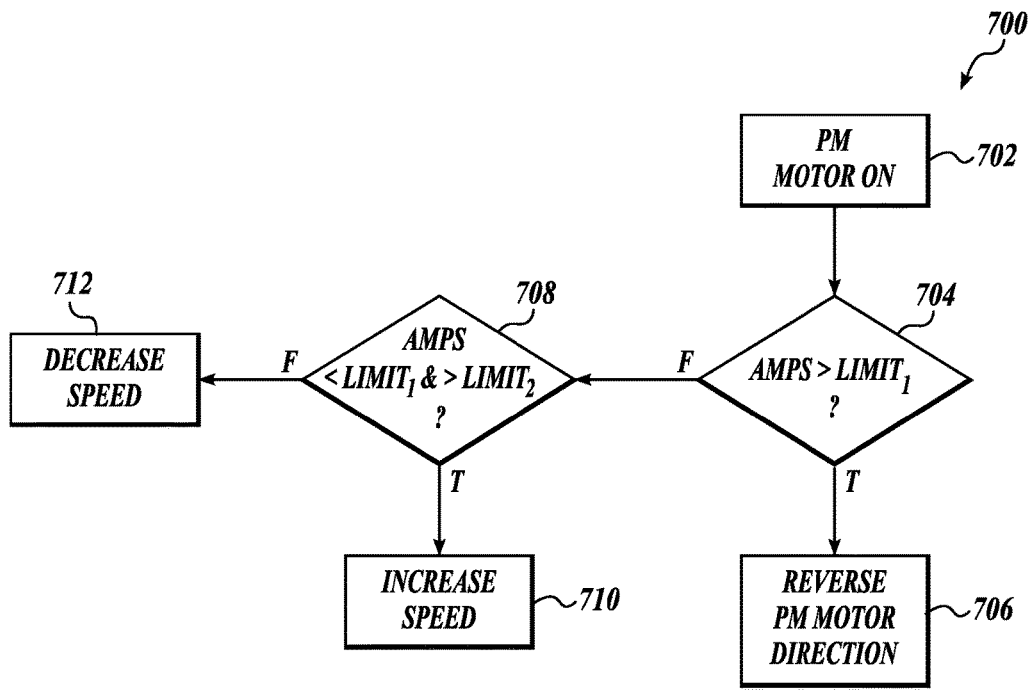
FIG. 7 is a flow diagram of a method of controlling a defrost device according to one embodiment of this disclosure.

FIG. 7 shows one embodiment of a method 700 of deciding when the permanent magnet motor 308 is reversed, when the permanent magnet motor 308 speed is increased, and when the permanent magnet motor 308 speed is decreased based on the current draw (amps) of the permanent magnet motor 308. In some embodiments, the algorithm of FIG. 7 can be performed by the controller 304.

In step 702, the permanent magnet motor is running at the normal operating conditions of speed, torque, and current draw based on an initially assumed accumulation of frost.

Step 704 signifies that the method is continually or constantly testing whether the measured current draw is greater than a first limit ($limit_1$) representing when the permanent magnet motor is stalled. The permanent magnet motor is designed to stall when the defrost device 312 is at the limit of travel in one direction. For example, the permanent magnet motor can stall when the defrost device 312 is prevented from further travel by a physical obstruction in the travel path.

When the decision in step 704 is TRUE, the method enters step 706 and reverses the direction of the permanent magnet motor, step 706. After reversing direction, step 706, the condition in step 704 should no longer be TRUE, the method returns to testing the current draw in step 704.

When the decision in step 704 is FALSE, the method enters step 708. Step 708 similarly is continually or constantly testing whether the measured current draw is greater than a second limit ($limit_2$). $Limit_2$ is a limit of current draw that represents that the permanent magnet motor is operating above of the designed operating current draw, which may be an indication that the rate of frost accumulation is increasing, and therefore the speed of the permanent magnet motor needs to be increased in order to keep up with the higher than normal accumulation of frost.

When the decision in step 708 is TRUE, the method enters step 710 and increases the speed of the permanent magnet motor, step 710 to a new higher speed. As long as the condition in step 708 is TRUE, the method keeps the permanent magnet motor operating at the higher speed. When the condition in step 708 is no longer TRUE, the method enters step 712 and decreases the permanent magnet motor speed to the normal operating speed, and the method continues testing whether the current exceeds $Limit_1$ or $Limit_2$. In some cases, when operating in step 710, the method may signal that the current has exceeded $Limit_1$ of step 704, in which case, step 704 will take precedence and the method will enter step 706 and reverse direction. When the condition in step 704 is no longer TRUE, the method will return to the speed of step 710 if the condition in step 708 is still TRUE. In some cases, a timer may be count the time in step 704 and step 708. Prolonged operation at high current draw may indicate a problem that requires the shutting off of the permanent magnet motor for inspection or repair.

While a simplified operating algorithm is illustrated based on current draw, it is to be appreciated that other more sophisticated algorithms are possible, for example, based on more than one instrument or variable. It should also be noticed that $Limit_1$ and $Limit_2$ will depend on the particular application and can take into account the refrigeration capacity, the defrost device capacity, the nominal power of the permanent magnet motor, and the air humidity, for example.

Figure 8:
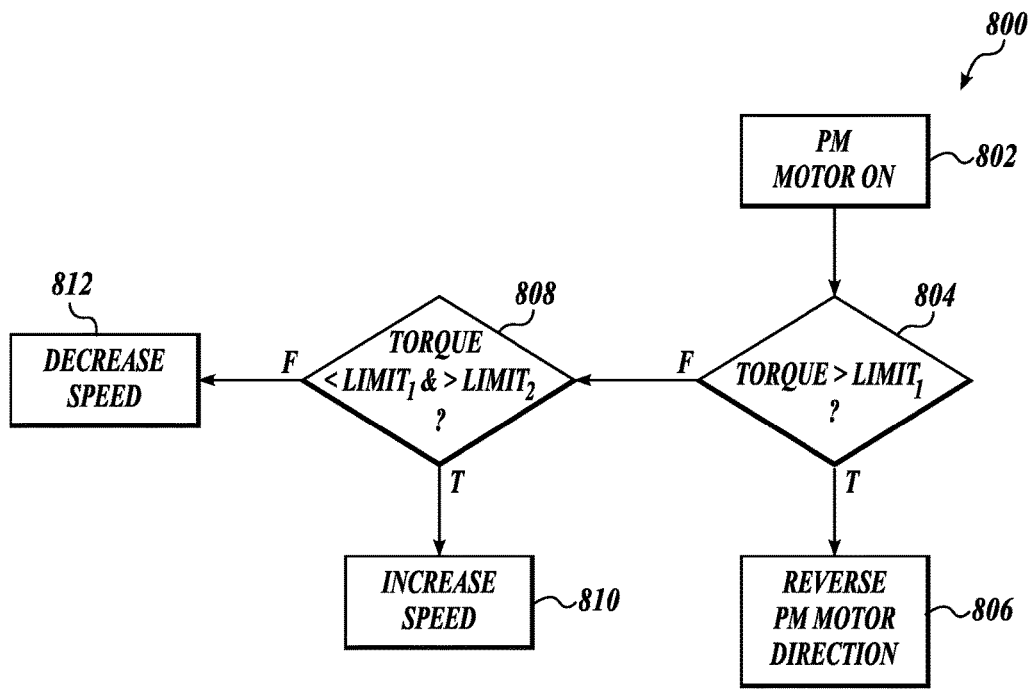
FIG. 8 is a flow diagram of a method of controlling a defrost device according to one embodiment of this disclosure.

FIG. 8 shows one embodiment of a method 800 of deciding when the permanent magnet motor 308 is reversed, when the permanent magnet motor 308 speed is increased, and when the permanent magnet motor 308 speed is decreased based on the torque produced by the permanent magnet motor 308. In some embodiments, the algorithm of FIG. 8 can be performed by the controller 304.

In step 802, the permanent magnet motor is running at the normal operating conditions of speed, torque, and current draw based on an initially assumed accumulation of frost.

Step 804 signifies that the method is continually or constantly testing whether the measured torque produced is greater than a first limit (limit$_1$) representing when the permanent magnet motor is stalled. The permanent magnet motor is designed to stall when the defrost device 312 is at the limit of travel in one direction. For example, the permanent magnet motor can stall when the defrost device 312 is prevented from further travel by a physical obstruction in the travel path.

When the decision in step 804 is TRUE, the method enters step 806 and reverses the direction of the permanent magnet motor, step 806. After reversing direction, step 806, the condition in step 804 should no longer be TRUE, and the method returns to testing the torque produced in step 804.

When the decision in step 804 is FALSE, the method enters step 808. Step 808 similarly is continually or constantly testing whether the measured torque produced is greater than a second limit (limit$_2$). Limit$_2$ is a limit of torque that represents the permanent magnet motor is operating above of the designed operating torque, which may be an indication that the rate of frost accumulation is increasing, and therefore the speed of the permanent magnet motor needs to be increased in order to keep up with the higher than normal accumulation of frost.

When the decision in step 808 is TRUE, the method enters step 810 and increases the speed of the permanent magnet motor, step 810 to a new higher speed. As long as the condition in step 808 is TRUE, the method keeps the permanent magnet motor operating at the higher speed. When the condition in step 808 is no longer TRUE, the method enters step 812 and decreases the permanent magnet motor speed to the normal operating speed, and the method continues testing whether the torque exceeds Limit$_1$ or Limit$_2$. In some cases, when operating in step 810, the method may signal that the torque has exceeded Limit$_1$ of step 804, in which case, step 804 will take precedence and the method will enter step 806 and reverse direction. When the condition in step 804 is no longer TRUE, the method will return to the speed of step 810 if the condition in step 808 is still TRUE. In some cases, a timer may be count the time in step 804 and step 808. Prolonged operation at high torque may indicate a problem that requires the shutting off of the permanent magnet motor for inspection or repair.

While a simplified operating algorithm is illustrated based on torque, it is to be appreciated that other more sophisticated algorithms are possible, for example, based on more than one instrument or variable. It should also be noticed that Limit$_1$ and Limit$_2$ will depend on the particular application and can take into account the refrigeration capacity, the defrost device capacity, the nominal power of the permanent magnet motor, and the air humidity, for example.

While a freezer is represented in FIG. 3, a defrost control subsystem is also disclosed. A defrost control system is disclosed that can be adapted to current freezers with a recurrently traveling defrost device. For example, freezers that currently use a switch or sensor to signal reversal of direction of the defrost device can be retrofit with the defrost control system according to this disclosure. Referring to FIG. 3, a defrost control system can include the permanent magnet motor 308, the AC frequency inverter or DC drive 306, and the controller 304. In some embodiments, a defrost control system for a freezer includes the permanent magnet motor 308 that is operatively connected, such as via a shaft, to a defrost device to power the defrost device. The defrost control system includes the AC frequency inverter or DC drive 306 connected to communicate with the permanent magnet motor 308. The defrosting control system includes a torque meter 317 or current meter 316 that measures the torque produced or current drawn by the permanent magnet motor 308. The defrosting control system includes the controller 304 having circuitry that compares a torque measurement or current measurement to predetermined values representing the performance characteristics of the permanent magnet motor 308 and reverses direction of the permanent magnet motor 308 when the torque measurement or current measurement has reached a first limit. In some embodiments, the linkage linking the motor shaft to the defrost device 312 does not include a gearbox or speed-reducing gears. In some embodiments, the defrost control system does not include switches or sensors to signal the reversal of the defrost device 312.

While illustrative embodiments have been illustrated and described, it will be appreciated that various changes can be made therein without departing from the spirit and scope of the invention.

The invention claimed is:

1. A freezer, comprising:
    cooling coils;
    a defrost device directed at the cooling coils, wherein the defrost device travels recurrently along the cooling coils; and
    a permanent magnet motor operatively connected to the defrost device to power the defrost device recurrently across the cooling coils, wherein the permanent magnet motor is configured to reverse direction when a speed of the motor reaches zero from a speed greater than zero.

2. The freezer of claim 1, further comprising:
    an AC frequency inverter or DC drive connected to the permanent magnet motor;
    a torque meter or current meter that measures the torque produced or current drawn by the permanent magnet motor; and
    a controller having circuitry that compares a torque measurement or current measurement to predetermined values representing the performance characteristics of the permanent magnet motor and reverses direction of the permanent magnet motor when the torque measurement or current measurement has reached a first limit.

3. The freezer of claim 2, wherein the controller has circuitry that compares a torque measurement or current measurement to predetermined values representing the performance characteristics of the permanent magnet motor and increases motor speed when the torque measurement or current measurement is below the first limit and at or above a second limit.

4. The freezer of claim 2, wherein the cooling coils, the defrost device, the permanent magnet motor, and the AC frequency inverter or DC drive are within an enclosure that is maintained below freezing (0° C.).

5. The freezer of claim 1, wherein the permanent magnet motor does not include a gear reducer between a motor shaft and the defrost device.

6. The freezer of claim 1, wherein the defrost device comprises nozzles directed at the cooling coils.

7. The freezer of claim 6, further comprising a source of pressurized air connected to the nozzles.

8. The freezer of claim 1, wherein the cooling coils are exposed to moisture in air.

9. The freezer of claim 1, wherein the freezer does not have switches to signal reversing travel direction of the defrost device.

10. The freezer of claim 1, wherein the permanent magnet motor is powered by direct current supplied by a battery or rectified alternating current.

11. The freezer of claim 1, wherein the permanent magnet motor comprises a rotor with permanent magnets and a stator with field windings.

12. The freezer of claim 1, wherein the permanent magnet motor comprises permanent magnets selected from the group consisting of aluminum-nickel-cobalt, ceramic/ferrite, samarium-cobalt, and neodymium-iron-boron.

13. The freezer of claim 1, further comprising a speed controller.

14. The freezer of claim 1, wherein the permanent magnet motor is operatively connected to the defrost device via a shaft.

15. A method for controlling the direction of a defrost device for cooling coils, comprising:
measuring the current drawn by or the torque produced by a permanent magnet motor, wherein the permanent magnet motor powers a defrost device recurrently along cooling coils; and
reversing the direction of the permanent magnet motor when the measured current drawn or measured torque produced are at or above a first limit, and wherein the permanent magnet motor is configured to reverse direction when a speed of the motor reaches zero from a speed greater than zero.

16. The method of claim 15, comprising directing air over frost accumulated on the cooling coils.

17. The method of claim 15, comprising comparing the measured current drawn to predetermined values representing performance characteristics of the permanent magnet motor.

18. The method of claim 15, comprising comparing the measured torque produced to predetermined values representing performance characteristics of the permanent magnet motor.

19. The method of claim 15, comprising comparing the measured current drawn to predetermined values representing performance characteristics of the permanent magnet motor, and increasing the permanent magnet motor speed when the measured current is below the first limit and above a second limit.

20. The method of claim 19, comprising reducing the speed of the permanent magnet motor when the measured current drawn is no longer above the second limit.

21. The method of claim 15, comprising comparing the measured torque produced to predetermined values representing performance characteristics of the permanent magnet motor, and increasing permanent magnet motor speed when the measured torque is below the first limit and above a second limit.

22. The method of claim 21, comprising reducing the speed of the permanent magnet motor when the measured torque is no longer above the second limit.

23. The method of claim 15, comprising operating the permanent magnet motor at a first speed, and operating the permanent magnet motor at a second higher speed when the measured current drawn by the permanent magnet motor or the torque produced by the permanent magnet motor are below the first limit and above a second limit.

24. The method of claim 23, comprising increasing voltage to increase speed of the permanent magnet motor.

25. The method of claim 23, comprising reducing the speed of the permanent magnet motor to the first speed when the measured current or torque is no longer above the second limit.

26. The method of claim 15, comprising reversing polarity of the permanent magnet motor to reverse direction of the permanent magnet motor.

27. A defrost system for a freezer having a defrost device, comprising:
a permanent magnet motor;
an AC frequency inverter or DC drive connected to the permanent magnet motor;
a torque meter or current meter that measures the torque produced or current drawn by the permanent magnet motor; and
a controller having circuitry that compares a torque measurement or current measurement to pre-determined values representing the performance characteristics of the permanent magnet motor and reverses direction of the permanent magnet motor when the torque measurement or current measurement has reached a first limit, and
wherein the permanent magnet motor is configured to reverse direction when a speed of the motor reaches zero from a speed greater than zero.

28. The defrost system of claim 27, wherein the permanent magnet motor comprises a shaft and a linkage connecting the shaft to a defrost device to power the defrost device.

29. The defrost system of claim 28, wherein the linkage does not comprise a gearbox.

30. The defrost system of claim 28, wherein the defrost system does not include a switch to signal reversing direction of the defrost device.

* * * * *